(12) United States Patent
Gardner

(10) Patent No.: US 8,892,982 B2
(45) Date of Patent: *Nov. 18, 2014

(54) METHOD AND SYSTEM FOR NETWORK LATENCY VIRTUALIZATION IN A CLOUD TRANSPORT ENVIRONMENT

(71) Applicant: AT & T Intellectual Property I, L.P., Atlanta, GA (US)

(72) Inventor: James Gardner, Atlanta, GA (US)

(73) Assignee: AT & T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/766,170

(22) Filed: Feb. 13, 2013

(65) Prior Publication Data

US 2013/0198315 A1 Aug. 1, 2013

Related U.S. Application Data

(63) Continuation of application No. 12/633,375, filed on Dec. 8, 2009, now Pat. No. 8,397,138.

(51) Int. Cl.
| | |
|---|---|
| *H03M 13/00* | (2006.01) |
| *H04L 29/08* | (2006.01) |
| *H04L 1/18* | (2006.01) |
| *H04L 12/26* | (2006.01) |
| *G06F 11/34* | (2006.01) |
| *G06F 15/167* | (2006.01) |
| *H04L 12/24* | (2006.01) |
| *H04L 1/00* | (2006.01) |

(52) U.S. Cl.
CPC .......... *G06F 15/167* (2013.01); *H04L 67/2842* (2013.01); *H04L 1/1874* (2013.01); *G06F 2201/81* (2013.01); *H04L 41/0816* (2013.01); *H04L 43/16* (2013.01); *G06F 11/3495* (2013.01); *G06F 2201/865* (2013.01); *H04L 1/188* (2013.01); *H04L 2001/0097* (2013.01); *G06F 11/3419* (2013.01); *H04L 43/0852* (2013.01); *G06F 2201/875* (2013.01)
USPC ....................................................... 714/775

(58) Field of Classification Search
USPC ........................................................ 714/775
See application file for complete search history.

(56) References Cited

U.S. PATENT DOCUMENTS

| | | | |
|---|---|---|---|
| 6,219,704 B1 * | 4/2001 | Kim et al. ..................... | 709/224 |
| 2002/0092030 A1 * | 7/2002 | Gu ............................... | 725/134 |
| 2008/0170501 A1 * | 7/2008 | Patel et al. .................... | 370/235 |
| 2009/0113554 A1 * | 4/2009 | Zalewski ...................... | 726/26 |

\* cited by examiner

*Primary Examiner* — Michael Maskulinski
(74) *Attorney, Agent, or Firm* — Fay Kaplun & Marcin, LLP

(57) ABSTRACT

A cache device is disposed on a connection path between a user computer executing a software application and a network. The application exchanges data with a further computer via the network. The cache device includes a cache memory and a processor. The cache device is configured to measure, by the processor, a first latency between the user computer and the further computer. The cache device is further configured to determine an acceptable latency range based on the latency and a requirement of the software application. The cache device is further configured to measure a second latency between the user computer and the further computer. The cache device is further configured to store, in the cache memory, a set of data transmitted from the user computer to the further computer, if the second latency is not within the acceptable latency range.

20 Claims, 2 Drawing Sheets

METHOD AND SYSTEM FOR NETWORK LATENCY VIRTUALIZATION IN A CLOUD TRANSPORT ENVIRONMENT

BACKGROUND

Data communications networks increasingly use mesh or connectionless transport of data. Many applications either require minimal network latency, or cannot tolerate wide momentary swings in latency, or both. However, mesh networks may typically be unable to meet one or both of these requirements.

SUMMARY OF THE INVENTION

A cache device is disposed on a connection path between a user computer executing a software application and a network. The application exchanges data with a further computer via the network. The cache device includes a cache memory and a processor. The cache device is configured to measure, by the processor, a first latency between the user computer and the further computer. The cache device is further configured to determine an acceptable latency range based on the latency and a requirement of the software application. The cache device is further configured to measure a second latency between the user computer and the further computer. The cache device is further configured to store, in the cache memory, a set of data transmitted from the user computer to the further computer, if the second latency is not within the acceptable latency range.

A computer readable storage medium stores a set of instructions executable by a processor. The set of instructions is operable to measure a first latency between a user computer and a further computer. The set of instructions is further operable to determine an acceptable latency range based on the latency and a requirement of a software application. The software application is executed by the user computer. The set of instructions is further operable to measure a second latency between the user computer and the further computer. The set of instructions is further operable to store, in a cache memory, a set of data transmitted from the user computer to the further computer, if the second latency is not within the acceptable latency range.

A system, comprising includes a plurality of interconnected devices and a plurality of cache devices. The plurality of interconnected devices form a network for exchanging data between user computing devices connected to the network. The plurality of cache devices is disposed on connection paths between the user computing devices and that network. The cache devices are configured to measure a first latency between the user computer and the further computer. The cache devices are further configured to determine an acceptable latency range based on the latency and a requirement of the software application. The cache devices are further configured to measure a second latency between the user computer and the further computer. The cache devices are further configured to store, in the cache memory, a set of data transmitted from the user computer to the further computer, if the second latency is not within the acceptable latency range.

DETAILED DESCRIPTION

Figure 1:
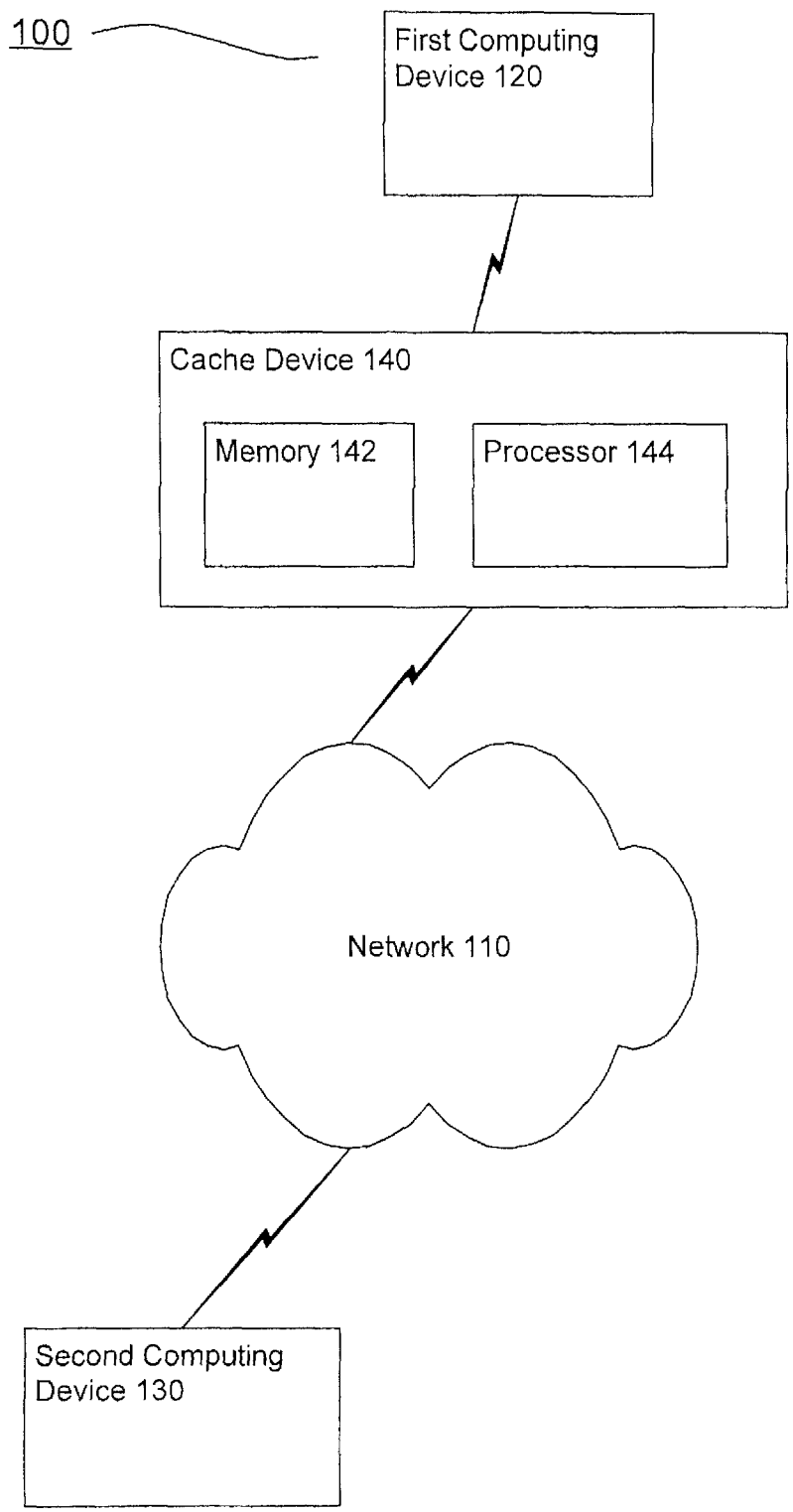
FIG. 1 shows a network according to an exemplary embodiment.

The exemplary embodiments may be further understood with reference to the following description and the appended drawings, wherein like elements are referred to with the same reference numerals. The exemplary embodiments describe systems and methods for virtualizing latency in a mesh transport network.

Data communication networks are, increasingly, using mesh or connectionless data transport. Such networks do not generally provide consistent latency between paths. Even private line networks often include protection mechanisms which may result in the loss of a transport path for a period of time during a protection event. When protection events occur, there may frequently be a significant change in network latency from the original path. As transmission distances and network demands increase, such variances in latency become more unacceptable.

Data services may be latency-sensitive in two ways. First, many data services demand minimal absolute latency, meaning that the tolerable length of the transmission path may be highly constrained; this may include, but is not limited to, synchronous mirroring storage area network ("SAN") applications. Second, many applications cannot tolerate wide momentary swings in latency, such as when transmission switches from a short path to a longer path; this may include SAN traffic or video traffic. Some data services, such as SAN, may even be latency-sensitive in both ways.

Transport paths in a mesh network may be virtualized between different types of transport, such as synchronous optical networking, dense wavelength division multiplexing and multiprotocol label switching. This may further complicate an application's ability to use the network, as various elements of the network not only have different latencies, but also other different network characteristics such as availabilities and protection intervals. The exemplary embodiments provide a mechanism for insulating an application from network path virtualization, and thereby insulating the application from corresponding performance variations.

FIG. 1 illustrates an exemplary system 100 for insulating an application from the effects described above. The system includes a network 110, which may be a mesh or connectionless network as described above. In some embodiments, the network 110 may be the Internet.

A first computing device 120 uses the network 110 for telecommunications purposes. The first computing device 120 may be any type of computing, system capable of conducting communications via a network. This may include a server, a desktop or laptop computer, a mobile computing device, etc. Communications with the network 110 may be wired or wireless. The first computing device 120 may include a memory and a processor, as well as networking equipment such as a wired network adapter, a wireless network adapter, etc. The first computing device 120 may execute a software application with latency demands as described above. Via the network 110 and in accordance with the software application, the first computing device 120 may communicate with a second computing device 130. As described above, communications between the first computing device 120 and the second computing device 130 via the mesh-type network 110 may be subject to latency swings as described above.

To address these latency issues, the system 100 includes a cache device 140. The cache device 140 may include a memory 142 storing instructions to operate its caching functions as will be described herein, and a processor 144 capable of executing these instructions. The cache device 140 may also include networking hardware as described above in order to allow it to send and receive data. The cache device 140 may be configured to dynamically allocate portions of its memory 142 between different applications being executed by the first computing device 120 (or, in an alternative exemplary system in which the cache device 140 is shared by a plurality of computing devices, between different computing devices). For example, the cache device 140 may provide a fixed cache capacity for a highly latency aggressive application, such as SAN, reflecting a product of the maximum data rate and maximum path length required to cache the entire unacknowledged traffic for the application.

The cache device 140 may be located at a point in the network at which path virtualization may occur. This may be at the edge of the network, or at the junction between a private line path and connectionless transport. The cache device 140 may physically be located at the same location as the first computing device 120, at a facility maintained by a network services provider, or at any other location that may accommodate its location within the network as described above.

Figure 2:
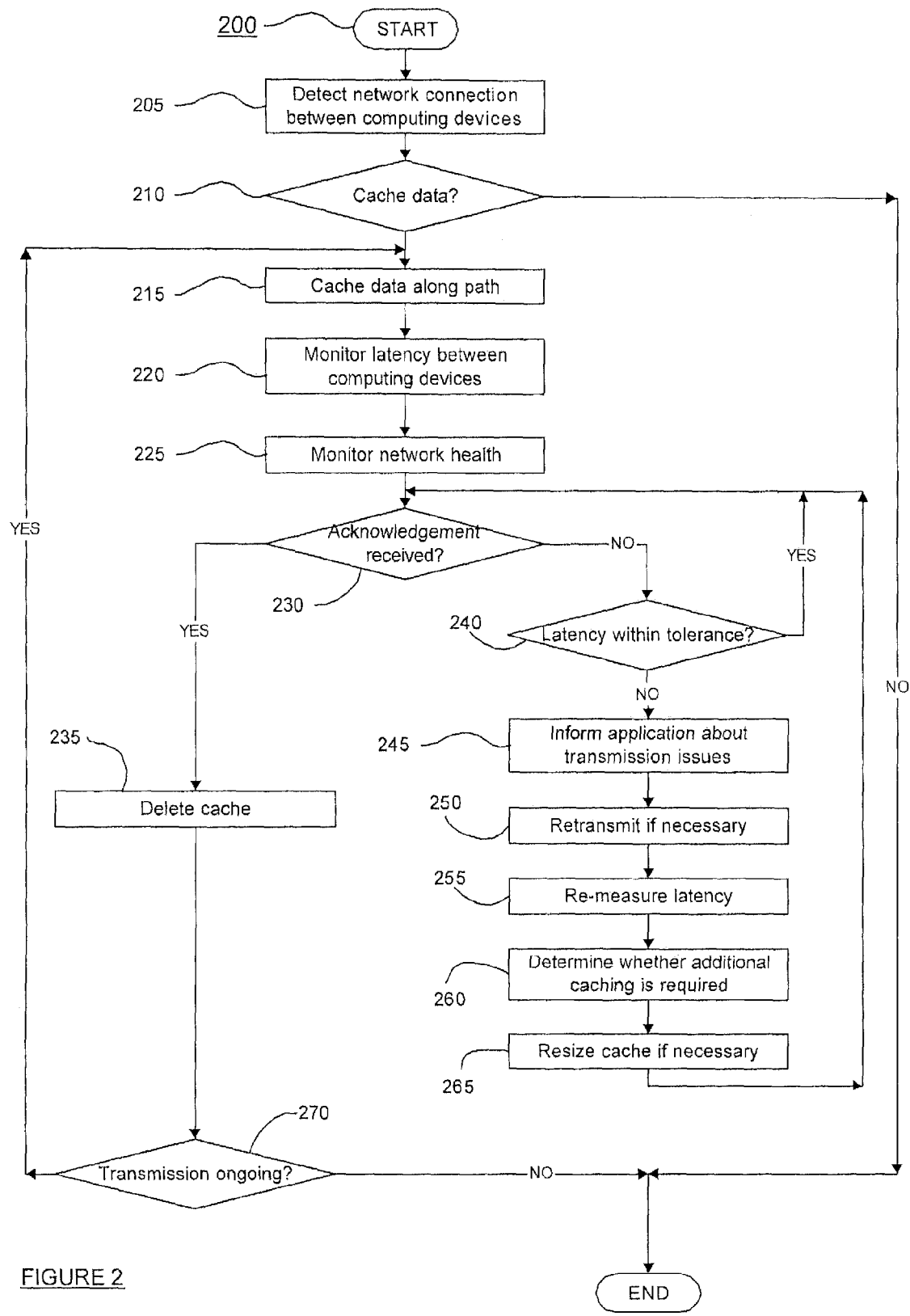
FIG. 2 shows a method according to an exemplary embodiment.

FIG. 2 illustrates an exemplary method 200 by which a cache device, such as the cache device 140 of FIG. 1, may operate in order to insulate an application, such as an application running on the first computing device 120, from the effects of virtualization of path. In step 205, the cache device 140 detects a network connection between the first computing device 120 and the second computing device 130. This may be caused by any type of application entailing transport of data between the first computing device 120 and the second computing device 130. In step 205, the cache device 140 also measures the latency of the communication and places tolerances upon the allowed latency. Tolerances may depend upon the type of network (e.g., connectionless, protected private line, unprotected private line, etc.), the type of application, etc.

In step 210, the cache device 140 determines whether to cache data flowing along the path from the first computing device 120 to the second computing device 130. Caching may be desirable based on, for example, either the type of data or the performance of the network. In one exemplary embodiment, caching may be triggered automatically for synchronously mirrored storage traffic and other highly latency aggressive applications, or for other traffic if an acknowledgement is not received within an expected time frame, it network signaling reveals an impending loss of transport path, or if too many packets are being lost. If caching is not selected, the method terminates. The method 200 may subsequently be re-initiated for a new network connection between computing devices.

If caching is selected, then in step 215 the cache device 140 caches data along the path from the first computing device 120 to the second computing device 130. In one exemplary embodiment, data may be cached until an acknowledgement is received. While caching is being performed, in step 220, the cache device 140 monitors the latency of communication between the first computing device 120 and the second computing device 130. In one exemplary embodiment, this may be accomplished by observing round-trip acknowledgement times. In one exemplary embodiment, latency may be constantly monitored by the cache device during the performance of the exemplary method 200. In another exemplary embodiment, latency may be monitored at predetermined times during the execution of the application.

In step 225, the cache device 140 monitors the health of the network 110. The precise nature of the monitoring may depend upon the type of network protocol in use. Specific events to be observed in monitoring network health may include switching to protection events, dropped packets, etc. Like step 210, network health may be monitored constantly or at predetermined times according to step 215 during the performance of the exemplary method 200.

Subsequently, in step 230, the cache device 140 determines whether an acknowledgement has been received. Those of skill in the art will understand that this determination may be made independently for each set of cached data. If an acknowledgement has been received, then in step 235, the cache device 140 deletes the cached data, and subsequently the method continues in step 270, which will be described below.

If the cache device 140 determines that an acknowledgement has not been received in accordance with known latency, then, in step 240, it continues to monitor the latency along the path from the first computing device 120 to the second computing device 130. If the latency has returned to a level within the allowable tolerance, as determined above in step 205, then the method returns to step 230, wherein the cache device again determines whether an acknowledgement has been received as described above. However, if the latency is still not at an allowable level, the method continues to step 245.

In step 245, the cache device 140 informs the application of transmission issues. This may involve handshaking with the application (e.g., an application being executed by the first computing device 120), informing it of changes in latency, and informing it that caching has been implemented/is still in place, and that signals received by the cache will be delivered. Next, in step 250 the cache device 140 retransmits cached data to synchronize data transmission between the first computing device 120 and the second computing device 130.

Subsequently, in step 255, the cache device 140 re-measures latency between the first computing device 120 and the second computing device 130. In step 260, the cache device 140 determines whether a transmission path that was previously not cached now requires caching. If so, caching is initiated for the path or paths now requiring caching. In step 265, the cache device 140 resizes the cache, if resizing is necessary based on the addition of an additional path or paths to the cache, or based on the amount of data presently stored in the cache. These changes may be required due to changes in latency and/or in physical path requiring different caching capacity. After step 265, the cache device 140 returns to step 230 and again determines whether an acknowledgement has been received, as described above.

If caching was performed and the cache was deleted in step 235, the method continues in step 270, wherein the cache device 140 determines whether communications are ongoing between the first computing device 120 and the second computing device 130. If so, the cache device 140 returns to step 215 and continues to monitor the latency therebetween. If not, the method terminates. Those of skill in the art will understand that the exemplary method 200 describes the caching process for a single application passing data from the first computing device 120 and the second computing device 130, and that the method 200 may be ongoing for other applications passing data among the same or other computing devices. Further, those of skill in the art will understand that caching of various units of data passing from the first computing device 120 to the second computing device 130 may be resolved independently of one another; a second unit of data may be received, cached, acknowledged and deleted while a first unit of data remains in the cache until it has been acknowledged.

The exemplary embodiments provide a data cache that may provide a variety of benefits to users of computing systems. Applications may be insulated from the effects of virtualization of latency when different transport protocols or paths are switched between. Tolerance settings may be used to determine whether a cache should be used when latency changes occur. Network conditions may be monitored to anticipate changes in latency. Cache usage may be allocated dynamically, and may provide differing degrees of service for applications with differing latency demands. Cache size may be determined dynamically using both fixed and dynamic usage.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A cache device disposed on a connection path between a user computer executing a software application and a network, the cache device comprising:
    a cache memory including a program containing computer-executable instructions; and
    a processor executing the computer-executable instructions to perform operations comprising:
        measuring a latency between the user computer and a further computer;
        storing, in the cache memory, a set of data transmitted from the user computer to the further computer, if the latency is not within an acceptable latency range; and
        storing, in the cache memory, a set of data transmitted from the user computer to the further computer, without regard to the latency, when a type of the software application is one of a predetermined set of types of applications.

2. The cache device of claim 1, wherein the operations further comprise:
    determining the acceptable latency range based on a previously measured latency between the user computer and the further computer and a requirement of the software application.

3. The cache device of claim 1, wherein the cache device is disposed at a point along the connection path at which path virtualization occurs.

4. The cache device of claim 1, wherein the operations further comprise:
    deleting, from the cache memory, the stored set of data, if the cache device receives an acknowledgement relating to the stored set of data.

5. The cache device of claim 1, wherein the network is a mesh network.

6. The cache device of claim 1, wherein the predetermined set of types of applications is a set of latency aggressive applications.

7. The cache device of claim 1, wherein the operations further comprise:
    resizing the cache memory.

8. The cache device of claim 1, wherein the operations further comprise:
    allocating a first portion of the cache memory to the software application; and
    allocating a second portion of the cache memory to a further software application.

9. The cache device of claim 8, wherein the further software application is executed by one of the user computer and a further user computer.

10. The cache device of claim 8, wherein a size of the first portion of the cache memory and a size of the second portion of the cache memory are determined based on the software application and the further software application.

11. A non-transitory computer-readable storage medium including a set of instructions that are executable by a processor to cause the processor to perform a method comprising:
    measuring a latency between a user computer executing a software application and a further computer;
    storing, in a cache memory, a set of data transmitted from the user computer to the further computer, if the latency is not within an acceptable latency range; and
    storing, in the cache memory, a set of data transmitted from the user computer to the further computer, without regard to the latency, when a type of the software application is one of a predetermined set of types of applications.

12. The non-transitory computer-readable storage medium of claim 11, further comprising:
    determining the acceptable latency range based on a previous measured latency between the user computer and the further computer and a requirement of the software application.

13. The non-transitory computer-readable storage medium of claim 11, wherein the operations further comprise:
    deleting, from the cache memory, the stored set of data, if the cache device receives an acknowledgement relating to the stored set of data.

14. The non-transitory computer-readable storage medium of claim 11, wherein the operations further comprise:
    alerting the software application, if the latency is not within the acceptable latency range.

15. The non-transitory computer-readable storage medium of claim 11, wherein the predetermined set of types of applications is a set of latency aggressive applications.

16. The non-transitory computer-readable storage medium of claim 11, wherein the operations further comprise:
    retransmitting the data to the further computer, if an acknowledgement is not received.

17. The non-transitory computer-readable storage medium of claim 11, wherein the operations further comprise:
    allocating a first portion of the cache memory to the software application; and
    allocating a second portion of the cache memory to a further software application.

18. The non-transitory computer-readable storage medium of claim 17, wherein the further software application is executed by one of the user computer and a further user computer.

19. The non-transitory computer-readable storage medium of claim 17, wherein a size of the first portion of the cache memory and a size of the second portion of the cache memory are determined based on the software application and the further software application.

20. A system, comprising:
    a plurality of interconnected devices forming a network for exchanging data between user computing devices connected to the network; and
    a plurality of cache devices disposed on connection paths between the user computing devices and the network, the cache devices being configured to perform operations comprising:
        measuring a latency between one of the user computing devices executing a software application and a further computing device;
        storing, in a cache memory of one of the cache devices, a set of data transmitted from the one of the user computing devices to the further computing device, if the latency is not within an acceptable latency range determined based on a requirement of the software application; and storing, in the cache memory, a set of data transmitted from the one of the user computing devices to the further computing device, without regard to the latency, when a type of the software application is one of a predetermined set of types of applications.

\* \* \* \* \*